United States Patent
Moses

(10) Patent No.: US 8,538,893 B1
(45) Date of Patent: Sep. 17, 2013

(54) APPARATUS AND METHOD FOR ELECTRONIC TRANSACTION EVIDENCE ARCHIVAL AND RETRIEVAL

(75) Inventor: Timothy E. Moses, Kanata (CA)

(73) Assignee: Entrust, Inc., Dallas, TX (US)

( * ) Notice: Subject to any disclaimer, the term of this patent is extended or adjusted under 35 U.S.C. 154(b) by 0 days.

(21) Appl. No.: 09/411,782

(22) Filed: Oct. 1, 1999

(51) Int. Cl.
*G06Q 20/00* (2012.01)

(52) U.S. Cl.
USPC ............. 705/75; 713/176; 713/178; 713/179; 726/26

(58) Field of Classification Search
USPC ...................................... 705/50–79
See application file for complete search history.

(56) References Cited

U.S. PATENT DOCUMENTS

| | | | | |
|---|---|---|---|---|
| 5,231,666 | A * | 7/1993 | Matyas | 705/75 |
| 5,802,511 | A * | 9/1998 | Kouchi et al. | 1/1 |
| 5,903,882 | A * | 5/1999 | Asay et al. | 705/44 |
| 5,910,987 | A * | 6/1999 | Ginter et al. | 705/52 |
| 6,044,462 | A * | 3/2000 | Zubeldia et al. | 713/158 |
| 6,058,383 | A * | 5/2000 | Narasimhalu et al. | 705/44 |
| 6,216,231 | B1 * | 4/2001 | Stubblebine | 726/10 |
| 6,233,565 | B1 * | 5/2001 | Lewis et al. | 705/35 |
| 6,314,517 | B1 * | 11/2001 | Moses et al. | 713/156 |
| 6,584,565 | B1 * | 6/2003 | Zamek | 713/156 |
| 6,615,347 | B1 * | 9/2003 | de Silva et al. | 713/156 |
| 6,839,879 | B1 * | 1/2005 | Hwang | 715/256 |
| 6,842,863 | B1 * | 1/2005 | Fox et al. | 726/5 |
| 7,124,190 | B1 * | 10/2006 | Moore | 709/229 |
| 7,133,846 | B1 * | 11/2006 | Ginter et al. | 705/54 |
| 8,032,743 | B2 * | 10/2011 | Asay et al. | 713/156 |
| 2001/0011255 | A1 * | 8/2001 | Asay et al. | 705/76 |
| 2001/0018739 | A1 * | 8/2001 | Anderson et al. | 713/176 |
| 2002/0065695 | A1 * | 5/2002 | Francoeur et al. | 705/7 |
| 2002/0091928 | A1 * | 7/2002 | Bouchard et al. | 713/178 |
| 2002/0161719 | A1 * | 10/2002 | Manning et al. | 705/64 |

OTHER PUBLICATIONS

New Applications Added to Sun's Grid Utility Site Network.com http://sun.systemnews.com/articles/109/2/news/17823.*
White, "How Computers Work", Millennium Edition, Sep. 1999, Que Corporation, Indianapolis, IN, all pages.*
New Applications Added to Sun's Grid Utility Site Network.com http://sun.systemnews.com/articles/109/2/news/17823, published in 2007 (copy provided with Office Action mailed Jun. 6, 2010).*

* cited by examiner

*Primary Examiner* — Jacob C. Coppola
(74) *Attorney, Agent, or Firm* — Faegre Baker Daniels LLP

(57) ABSTRACT

An electronic transaction evidence archive apparatus and method archives electronic transaction evidence, such as public key based electronic transaction evidence on behalf of a first party. The apparatus and method determines redundant electronic transaction evidence and removes the redundant electronic transaction evidence prior to archival. In one embodiment, the electronic transaction evidence archive apparatus and method indexes received electronic transaction evidence and archives the indexed data elements thereof. When a subsequent archival request is made, the apparatus and method evaluates the index data to determine redundant electronic transaction evidence and discards redundant information to save memory resources. The first party provides the electronic transaction evidence in, for example, an archive evidence bundle, which includes data elements related to a single transaction.

39 Claims, 3 Drawing Sheets

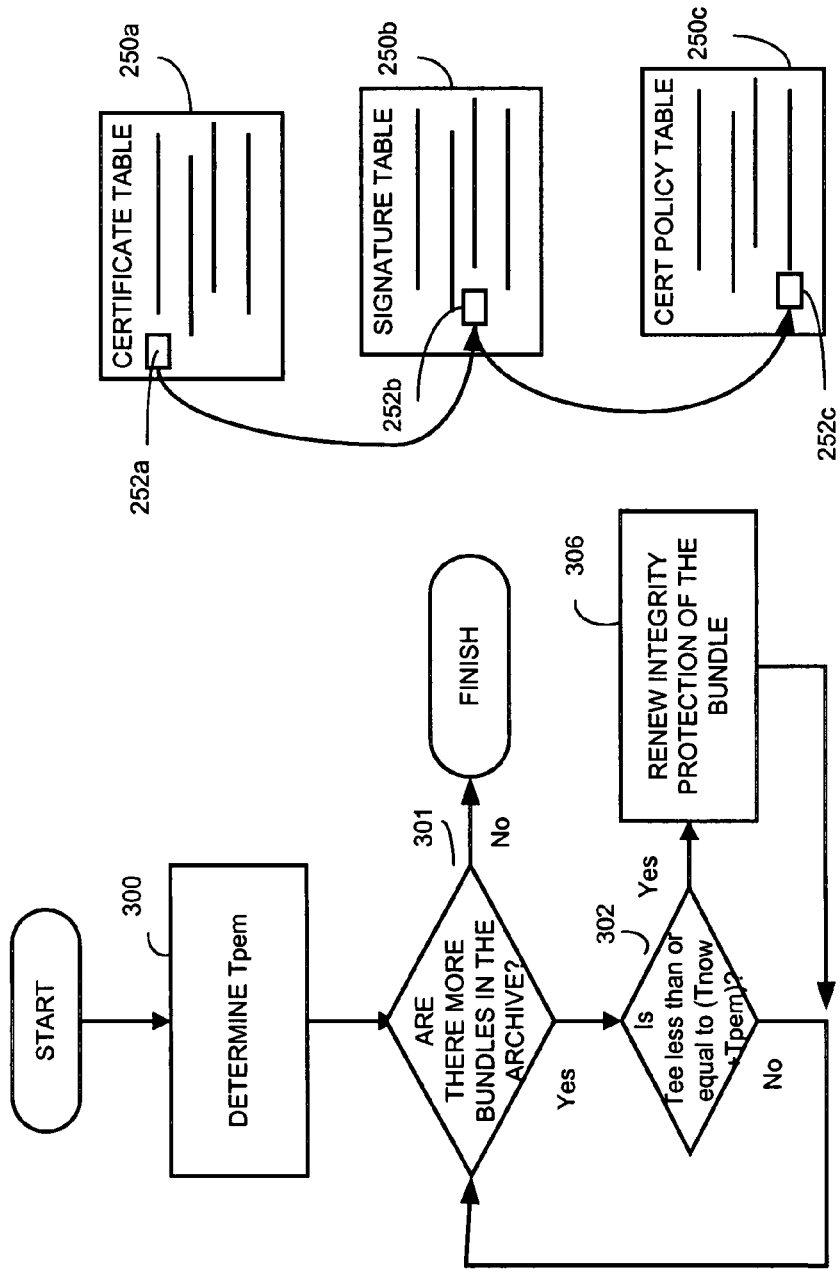

APPARATUS AND METHOD FOR ELECTRONIC TRANSACTION EVIDENCE ARCHIVAL AND RETRIEVAL

FIELD OF THE INVENTION

The invention relates generally to systems and methods for archiving data and more particularly to systems and methods for archiving cryptographically produced data

BACKGROUND OF THE INVENTION

With the increase in electronic commerce, the encryption of proprietary information and the application of electronic signatures to documents and other content is becoming more widespread. In some cryptography based systems, such as those employing public key cryptography techniques, digital signature key pairs (a private key and a public key) are used to authenticate a digital signature of a subscriber to ensure that a message sent by a subscriber actually came from the subscriber sending the message. In addition to digital signature key pairs, encryption key pairs are also generally used to encrypt the data being sent from one subscriber to another subscriber.

Certificates are generated by a manager or trusted certification authority, such as a network server, for the public keys of the private/public key pair to certify that the keys are authentic and valid. The public keys and certificates are used for two main purposes: verifying a digital signature and encrypting information. The receiver of a digitally signed e-mail or document for example, typically uses the public key in the sender's certificate to verify the digital signature of the sender. A subscriber wishing to send encrypted e-mail first encrypts the e-mail with a random symmetric key, then uses the intended receiver's public key to encrypt the symmetric key and then attaches the encrypted symmetric key to the encrypted e-mail so that the receiver can decrypt the e-mail. A subscriber unit sending a message sends the encrypted data with its digital signature along with a certificate.

The certificate has the certification authority's signature embedded as part of the certificate. A receiver validates the digital signature by looking at the received certificate. Each client stores a certification authority public key to verify that the certificate was made by the trusted certification authority.

In typical public key cryptography systems, the certification authorities are capable of revoking public key certificates if for example the user's privileges are withdrawn. The certification authority also revokes certificates if the public key of a subscriber is somehow compromised and the subscriber or security personnel notifies a certification authority that the certificate should be revoked so that subsequent receivers of the public key certificate are not fooled into thinking that the sender is the actual subscriber sending the message. For example, in the case of a stolen private key, the unscrupulous holder of the stolen private key could act as the proper user. However if the certification authority revokes the public key certificate for that subscriber, all subscribers receiving messages from the subscriber using a revoked public key certificate are notified through a certificate revocation list (CRL) listing the revoked certificates. Therefore a receiver of a message from an unscrupulous hacker can determine that the content of the message is untrustworthy. In prior art public key cryptography systems, in addition to CRLs, authority revocation lists (ARL) are also typically generated by certification authorities. The authority revocation lists indicate that a particular certification authority has been revoked so that all certificates issued from that certification authority are no longer valid.

As more and more electronic transactions are being made via electronic based networks, digital signature data and other digital data may need to be authenticated at a later date, for example in legal proceedings many years after an electronic agreement was executed. For example, if a wire transfer had been made electronically from one client to another and a dispute arises fifty years later, a mechanism is needed to ensure that the digital signature on the wire transfer was in fact authentic at the time it was sent and that the transaction was wired by authorized personnel. In addition, as technology becomes more efficient at breaking cryptographic codes, digital documents that are digitally signed at one point in time may be easy to forge ten years later which may allow an unscrupulous person to attempt to modify the terms of a contract or wire transfer. As such, the proper archival of digital data can be essential to ensuring that long term confidence in electronic transactions and communication of other information is maintained. Later evaluation and scrutiny of electronic commercial transactions, electronic contracts and other data may be necessary to avoid repudiation by parties involved. A problem arises if important information is not archived in a timely and proper manner since the information may be lost or may be exposed to tampering by an unscrupulous party. Also, archival can require the use of large and expensive storage capacity.

Accordingly, with electronic commerce dispute resolution requirements it can be difficult to reconstruct electronic transactions many years later. A typical transaction may include, for example, digital signatures and corresponding public key certificates, in the case where public key infrastructure is used. As such, such certificates may expire over a period of time and need to have their authenticity restored. Non-repudiation services are described, for example, in ISO-13888. In addition, validation authorities are known which may have a first party sender certificate for validation to a trusted third party authority. The trusted third party authority then finds a certificate's revocation status information, such as associated CRLs and returns a yes or no answer to the requesting party indicating whether the certificate is valid. Other systems may provide some type of restoration of authenticity, such as where a trusted authority uses a notary service where the notary service may apply a time stamp and associated digital signature to information sent to it. The notary may verify the digital signature of one or more certificates to confirm that they were authentic, at least at the time that the notary received the information. However, such systems do not generally provide archival of electronic transaction evidence information or retrieval of that information. Although archival services are known that periodically time stamp the information, such information is not typically archived in an efficient manner to reduce storage requirements since such known offsite archival systems may only store the exact transaction information without determining whether or not any redundant information may be present.

Consequently, a need exists for an apparatus and method for electronic transaction evidence archival and retrieval that facilitates a reduction in storage requirements while also providing a restoration of authenticity of stored information, if desired.

BRIEF DESCRIPTION OF THE DRAWINGS

The below-described invention will be more readily understood in light of the below-identified figures, wherein:

FIG. 3 is a flow chart illustrating one example of an integrity renewal process in accordance with one embodiment of the invention; and FIG. 4 is a graphic illustration of public key-based archival indexing in accordance with one embodiment of the invention.

DETAILED DESCRIPTION OF THE PREFERRED EMBODIMENT

Briefly, an electronic transaction evidence archive apparatus and method archives electronic transaction evidence, such as public key based electronic transaction evidence on behalf of a first party. The apparatus and method determines redundant electronic transaction evidence and removes the redundant electronic transaction evidence prior to archival. In one embodiment, the electronic transaction evidence archive apparatus and method indexes received electronic transaction evidence and archives the indexed data elements thereof. When a subsequent request is received, the apparatus and method evaluates the index data to determine redundant electronic transaction evidence and discards redundant information to save memory resources. The first party provides the electronic transaction evidence in, for example, an archive evidence bundle, which includes data elements related to a single transaction.

When applied to a public key-based information security system, the archive evidence bundle may include digital signature data, certificates, including revocation information, certificate policy data, reliance entitlement tokens, and one or more time stamps, if desired, on these data elements. An electronic transaction evidence archiving processor checks each certificate in a bundle to determine its respective expiry time. The archival processor determines an earliest expiry time for the bundle based on the certificate having the earliest expiry time. Before the expiry time is reached, the archival processor renews the integrity protection for the bundle by, for example, having the bundle time stamped by a trusted authority, which authority digitally signs the time stamped bundle. Alternatively, the archival processor may also apply its own digital signature to the information if it is a trusted authority.

Figure 1:
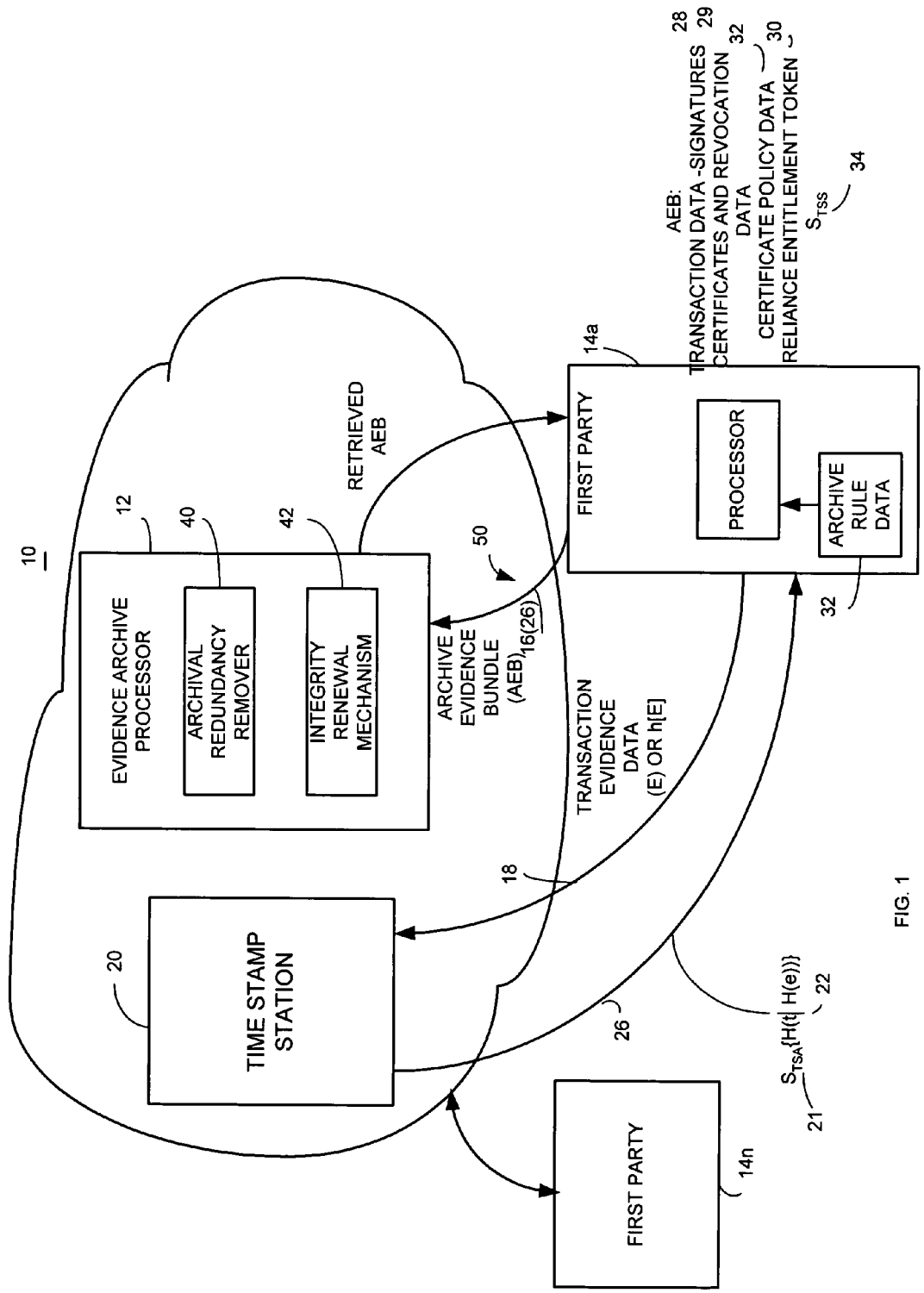
FIG. 1 is a block diagram illustrating one embodiment of a system for electronic transaction evidence archival and retrieval in accordance with one embodiment of the invention.

Referring to FIG. 1, one embodiment of a transaction evidence archival system 10 is shown having an evidence archive processor 12 and one or more parties 14 that request archival of electronic transaction evidence. The evidence archive processor 12 may be an executing software module, which may be incorporated, for example, in an intranet server, Internet server, stand alone processing device, or any other suitable device. As shown in this example, the evidence archive processor 12 is a server suitably linked in an infrastructure such as an Internet infrastructure or intranet infrastructure to a plurality of parties 14a-14n.

Each of the parties is in operative communication through any suitable communication mechanism to the evidence archive processor 12. If desired, the evidence archive processor 12 may be incorporated as a certification authority or as a separate entity in a public key infrastructure. Accordingly, parties 14a-14n may be any suitable processors, software applications or other entities which may use public key cryptography engines, such as those providing digital signatures and/or encryption capabilities.

The evidence archive processor 12 archives in this example, public key based electronic transaction evidence 16 on behalf of a first party 14a. The public key based electronic transaction evidence 16 may be an archive evidence bundle provided by the party 14a. For example, the archive evidence bundle may be provided by having electronic transaction evidence 18 or a hash thereof h[E], time stamped by a time stamp station 20. The time stamp station 20 may apply a time stamp TS 22 and a digital signature 24 to the electronic transaction evidence 18 in the form of a reply message 26.

The archive evidence bundle 16 may include, for example, cryptographic signature data 28 related to an electronic transaction, certificate data 29, such as public key certificates related to the cryptographic signature data that was used in the transaction, such as X.509-type certificates or any other suitable data structures. Other data may include revocation status data which may include, for example, the date or time after which the certificate may not be trusted. In addition, the archive evidence bundle 16 may include reliance entitlement token 30 wherein the reliance entitlement token 30 is associated with a recipient of the archive evidence when it is retrieved. For example, the reliance entitlement token 30 may include data representing qualification data indicating that the receiver of the certificate is entitled to rely on the certificate. This data may be, for example, evidence that the recipient is a member of a particular group. In addition, the archive evidence bundle may also include certificate policy data 32 indicating, for example, policies associated with cryptographic operations such as the password length required, type of encryption algorithm to be used, or any other suitable information. In addition, the archive evidence bundle may also include a signature and time stamp 20, including the time stamp data associated with the archive evidence bundle 34. It will be recognized that any other suitable data to be archived may also be used.

The evidence archive processor 12 also determines redundant electronic transaction evidence through a redundancy checker 40. In addition, the evidence archive processor 12 removes any redundant public key based electronic evidence prior to archiving. Also, the evidence archive processor 12 also includes an integrity protection renewal mechanism 42 that renews the integrity of an archive evidence bundle based on determination, for example, that a certificate is about to expire. Where multiple certificates are included, the expiry time for the archive evidence bundle is determined to be the expiry time of the earliest to expire certificate. The integrity protection renewal mechanism 42 may be any suitable software, firmware, hardware or any combination thereof. The evidence archive processor 12 uses the integrity protection renewal mechanism 42 to facilitate time stamping of archived public key-based electronic transaction data by a time stamp station 20, or any other suitable time stamp mechanism in response to a request for integrity renewal determined based on the expiry data from the earliest to expire certificate, such as public key expiry data or other data within the archived data. The integrity protection renewal mechanism determines the archive evidence bundle expiry data for at least a portion of the data within the electronic transaction evidence, such as a certificate within the archive evidence bundle, and presents archived electronic transaction evidence for renewal by a trusted party. For example, the evidence archive processor 12 may present an archive evidence bundle (or a hash thereof) after reassembly, to the time stamp station 20 or other suitable trust authority. The trust authority then time stamps and signs the bundle whereafter it may again be disassembled and archived by the evidence archive processor. As such, the integrity protection renewal mechanism 42 checks each certificate expiry time, represented as public key expiry data (e.g., bits in a certificate representing a date and time of public key expiry, that serves as the archive evidence bundle expiry data) in each bundle and keeps track of which bundle is about to expire and provides the bundle to a trusted authority. The trusted authority then verifies the requisite signatures in the bundle, and provides a time stamp and digital signature to renew the integrity of the archive evidence bundle. As a result, whenever the evidence is retrieved for transaction dispute resolution, there is evidence of continued integrity. It will be recognized by one of ordinary skill in the art, that where public key certificates are not used to contain the expiry time of a public key pair, any suitable public key expiry data may be used.

The first party 14a requests archival of the archive evidence bundle in the form of a request generally indicated as 50, which includes request data along with the archive evidence bundle. The request 50 may be generated based on archive rule data 32 stored by or accessible by the party 14a. As such, the first party 14a will generate an archive evidence bundle containing, for example, public key-based electronic transaction evidence in response to archive rule data. The archive rule data 32 may be communicated to the first party by a trusted authority, or available in a directory, for example, which indicates that archival must occur for a given application running on the processor, the frequency of archiving that is required, or any other suitable archive rule data. The archive rule data may be data contained, for example, in a policy rule certificate such as a certificate in the form of an X.509 type certificate or any other suitable mechanism to allow the first party to determine whether data should be archived and, for example, the contents of the archive evidence bundle. The first party 14a submits the transaction evidence 18 to the time stamp station 20 prior to requesting archival of the archive evidence bundle. As such, the first party requests archival of public key-based electronic transaction evidence and provides public key-based electronic transaction evidence for the evidence archive processor 12. Provision of the archive evidence bundle, may be in a direct format such as a communication directly with the evidence archive processor, or indirectly through publication in a directory or other manner accessible by the evidence archive processor.

Figure 2:
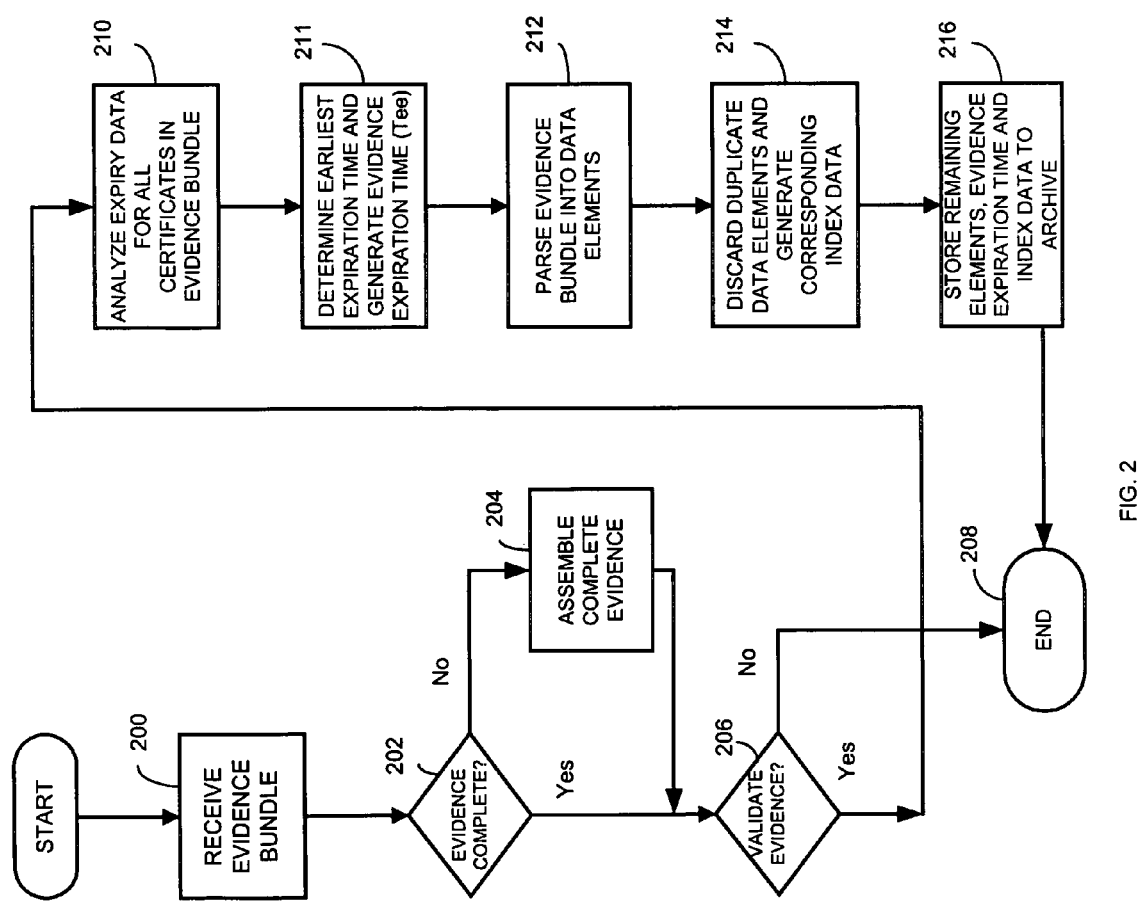
FIG. 2 is a flow chart indicating one embodiment of an archival method in accordance with one embodiment of the invention.

FIG. 2 shows one method of archival in accordance with one embodiment of the invention wherein, for example, the evidence archive processor 12 receives an archive evidence bundle as shown in block 200. As shown in block 202, the process includes determining whether the archive evidence bundle is complete. This may be done, for example, by comparing the data elements within the archive evidence bundle with a pre-stored list of acceptable archive evidence data elements. The pre-stored acceptable elements may be stored in any suitable location and may be controlled through central control so that one or more evidence archive processors may be commonly controlled to store certain transaction data in a certain form. If it is determined by evaluating the data elements in the bundle, that evidence is missing, the evidence archive processor 12 assembles complete evidence for the bundle as shown in block 204.

This may be done, for example, where essential archival evidence is required, such as a public key certificate of a certification authority. If the first party sends an archive evidence bundle without the required certificate, the evidence archive processor may retrieve the requisite public key certificate from a suitable directory and attach it to the archive evidence bundle. This may be useful, for example, where a large volume of archival requests are being generated and where the evidence archive processor already has stored therein a copy of the missing required evidence so that the party requesting archival need not communicate with other processors or devices to obtain the missing information.

As shown in block 206, if the evidence is complete, the evidence archive processor 12 may optionally validate the evidence by validating, for example, the signature of a time stamp authority 20 or the digital signature of the first party sending the evidence for archival. If it is determined that the digital signature being validated does not validate, the evidence archive processor will not archive the evidence as indicated in block 208. However, if validation is successful on the requisite signatures, the evidence archive processor analyzes the expiry times for all certificates in the archive evidence bundle as shown in block 210. For example, the expiry times may be analyzed in each of the certificates of a bundle to determine the expiration time for the bundle. The integrity renewal mechanism 40 then generates the evidence bundle expiration time $T_{ee}$ indicating when expiration for that particular bundle will occur. As shown in block 212, the evidence archive processor 12 continues to parse the data elements of the archive evidence bundle into its component parts. The redundancy checker removes redundant evidence from the bundle by discarding duplicate data elements. This is shown in block 214. For example, where an archive evidence bundle is received, the evidence archive processor 12 determines whether the exact data has already been stored for a given public key transaction. For example, if a public key signing certificate for a first party, or a trusted authority, has already been stored, the evidence archive processor will discard the duplicate information. Similarly, if it is detected that certificate policy information is identical to that which is already stored, the evidence from the archive evidence bundle is discarded. As such, unrelated transactions can use the same archived data.

Referring to FIG. 4, the evidence archive processor 12 stores the remaining components by indexing the information in a plurality of tables as shown in block 216. The tables 250a-250c, for example, may be a table 250a indicating all public key certificates stored by the evidence archive processor, digital signatures stored in a table 250b and certificate policy data stored in table 250c containing all policy information currently stored by the evidence archive processor 12. As shown, an archive evidence bundle containing each of the data elements stored in each of the tables, may be represented by a series of index data 252a, 252b and 252c, such that one evidence bundle is categorized as a series of index points pointing to data stored in tables 250a-250c. In addition, any other suitable data may also be stored including the evidence expiry time data. As such, the evidence archive processor indexes data elements of the electronic transaction evidence and the redundancy checker determines redundant public key-based data by comparing data elements of newly received public key-based electronic transaction evidence for archival, with stored index data elements. The redundancy checker will then remove the redundant public key-based electronic archive evidence prior to archiving by discarding the data elements that already exist as indexed archived data.

Referring to FIG. 3, one example of electronic evidence transaction integrity renewal is shown. The evidence integrity renewal processor 42 evaluates the archive evidence bundle to determine archive evidence bundle expiry data to facilitate renewal of the integrity protection of the evidence bundle to provide an updated expiry time for the archive evidence bundle. As shown in block 300, the protection expiry margin ($T_{pem}$) is determined, based upon the frequency with which the integrity renewal process is executed. Then the process examines all evidence bundles in the archive, one at a time until finished as shown in block 301. It determines whether the remaining integrity protection on each bundle is less than the determined margin, as shown in block 302. If it is, then the evidence bundle integrity protection is renewed, as shown in block 306. If it is not, then the evidence bundle is left unmodified. The process then goes on to examine the next evidence bundle in the archive until all bundles have been examined.

Renewal may occur in any suitable manner. For example, the process may include the original time stamp data $T_o$ for the bundle, wherein:

$$T_0 = t_0 | H(E) | S_{TSA}\{H(t_0|H(E))\} | \text{cert}_{TSA}$$

Where:
$t_o$ is the time, according to the time stamp authority, at which the time stamp ($T_o$) is created;
H(E) is a hash value calculated over the evidence;
$S_{TSA}\{X\}$ is the signature of the time stamp authority over the data X; and
$\text{cert}_{TSA}$ is the signature verification certificate of the time stamp authority.

The original time stamp is then sent to a trusted third party which time stamps the information and signs the information to generate $T_1$, wherein:

$$T_1 = t_1 | T_0 | S_{TSA}\{H(t_1|T_0)\} | \text{cert}_{TSA}$$

Where:
$t_1$ is the time, according to the time stamp authority, at which the time stamp ($T_1$) is created.

This new time stamp, $T_1$, is then returned to the evidence archive processor for storage in addition to the existing stored information.

The disclosed system may be implemented as indicated in any suitable form, such as software, firmware, hardware, or any suitable combination thereof. In addition, a storage medium such as a CD ROM, server, RAM, or any other suitable storage mechanism may be used to store executable instructions that when read by one or more processors causes the processors to perform the functions and operations as indicated above.

The disclosed system, among other advantages, provides a structured archival mechanism for cryptographic related information so that subsequent transaction resolutions can be facilitated. In addition, memory is efficiently used by indexing the information and storing the information required by removing redundant evidence. In addition, the use of archival rule data allows control on a per-application basis, per node basis, or any other suitable gradation.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. Electronic transaction evidence archive apparatus comprising:
one or more processors that are operative to execute stored instructions that when executed cause the one or more processors to:
determine redundant public key based electronic transaction evidence based on a received archive evidence bundle and data from one or more stored archive evidence bundles;
remove the determined redundant public key based electronic transaction evidence prior to archiving wherein the electronic transaction evidence includes an archive evidence bundle including: cryptographic signature data related to an electronic transaction, public key certificate data related to the cryptographic signature data including public key expiry data for each of the plurality of certificates, at least one reliance entitlement token associated with a recipient of the retrieved archive evidence;
archive the public key based electronic transaction evidence on behalf of at least a first party; and
determine archive evidence bundle expiry data based on the public key expiry data from the plurality of certificates and provide integrity renewal of the evidence bundle by providing an updated expiry time for the archive evidence bundle by determining an earliest expiry time for the archived public key based transaction evidence in response to the public key expiry data for all of the plurality of certificates in the bundle.

2. The apparatus of claim 1 including an evidence archival controller, associated with the first party, for determining whether to provide public key based electronic evidence for archiving in response to first party trusted evidence archive rule data.

3. The apparatus of claim 1 comprising a server device that comprises the one or more processors and wherein the server device is operative to present archived electronic transaction evidence for integrity renewal by a trusted party.

4. The apparatus of claim 1 wherein the archive evidence bundle further includes at least:
certificate policy data associated with the public key certificate data; and
time stamp data associated with the archive evidence bundle.

5. The apparatus of claim 3 wherein the trusted party includes a time stamp station operative to time stamp archived evidence in response to the archive evidence bundle expiry data.

6. The apparatus of claim 1 wherein the reliance entitlement token includes data representing that a recipient of a certificate in an archive evidence bundle is entitled to rely on certificate data in the bundle.

7. The apparatus of claim 1 wherein the one or more processors compares data elements of newly received public key based electronic transaction evidence for archival with the indexed data elements and discards data elements that already exist as indexed archived data.

8. The apparatus of claim 7 wherein the data elements include at least one data element from the group of: certificate identification data, digital signature identification data, certificate policy data, evidence bundle expiry data, transaction type data, and time stamp data.

9. The apparatus of claim 7 wherein the one or more processors is operative to retrieve archived public key based electronic transaction evidence, in response to a retrieval inquiry, wherein retrieving includes reassembling a predefined bundle of archived public key based transaction evidence data elements using index data that was used to index the indexed data elements.

10. A system for electronic transaction evidence archival comprising:
a server device comprising one or more processors that are operative to execute stored instructions that when executed cause the one or more processors to, the server device operative to:

determine redundant public key based electronic transaction evidence based on a received archive evidence bundle and data from one or more stored archive evidence bundles;

remove the determined redundant public key based electronic transaction evidence prior to archiving;

a first party device in operative communication with the server device, and operative to request archival of public key based electronic transaction evidence and for providing the public key based electronic transaction evidence to the server device;

wherein the electronic transaction evidence includes an archive evidence bundle including: cryptographic signature data related to an electronic transaction, public key certificate data comprising a plurality of certificates related to the cryptographic signature data each including public key expiry data and at least one reliance entitlement token associated with a recipient of the retrieved archive evidence;

the server device operative to archive the public key based electronic transaction evidence on behalf of at least the first party; and the server device operative to determine archive evidence bundle expiry data based on the public key expiry data form the plurality of certificates and providing integrity renewal of the evidence bundle by providing an updated expiry time for the archive evidence based on determining an earliest expiry time for the bundle in response to the public key expiry data for all of the plurality of certificates in the bundle.

11. The system of claim 10 including a time stamp station operative to time stamp archived public key based electronic transaction data in response to a request from the server device based on a determination of expiry of a data element within the archived data.

12. The system of claim 11 wherein the time stamp station is operative to time stamp the archive evidence bundle prior to a request being sent for archiving.

13. The system of claim 12 wherein the time stamp station is a trusted time stamper and digitally signs the archive evidence bundle prior to the archive evidence bundle being archived.

14. The system of claim 11 including an evidence archival controller, associated with the first party, for determining whether to provide public key based electronic evidence for archiving in response to first party trusted evidence archive rule data.

15. The system of claim 10 wherein the archive evidence bundle further includes at least:
   certificate policy data associated with the public key certificate data; and
   time stamp data associated with the archive evidence bundle.

16. The system of claim 10 wherein the reliance entitlement token includes data representing that a recipient of a certificate in an archive evidence bundle is entitled to rely on certificate data in the bundle.

17. The system of claim 10 wherein the server device indexes data elements of the electronic transaction evidence and compares data elements of newly received public key based electronic transaction evidence for archival with the indexed data elements and discards data elements that already exist as indexed archived data.

18. The system of claim 17 wherein the data elements include at least one data element from the group of: certificate identification data, digital signature identification data, certificate policy data, evidence bundle expiry data, transaction type data, and time stamp data.

19. The system of claim 17 wherein the server device retrieves archived public key based electronic transaction evidence, in response to a retrieval inquiry, wherein retrieving includes reassembling a predefined bundle of archived public key based transaction evidence data elements using index data that was used to index the indexed data elements.

20. An electronic transaction evidence archive method performed by one or more machines comprising steps of:
   determining redundant public key based electronic transaction data based on a received archive evidence bundle and data from one or more stored archived evidence bundles; and
   removing the determined redundant public key based electronic transaction data prior to archiving public key based electronic transaction evidence on behalf of at least a first party;
   wherein the electronic transaction evidence include an archive evidence bundle including: cryptographic signature data related to an electronic transaction, public key certificate data comprising a plurality of certificates related to the cryptographic signature data each including public key expiry data, at least one reliance entitlement token associated with a recipient of the retrieved archive evidence;
   archiving the public key based electronic transaction evidence on behalf of at least a first party;
   determining archive evidence bundle expiry data based on the public key expiry data from the plurality of certificates; and
   renewing the archived public key based transaction evidence to provide an updated expiry time for the archive evidence based on determining an earliest expiry time for the bundles in response to the public key expiry data for all of the plurality of certificates in the bundle.

21. The method of claim 20 wherein the electronic transaction evidence includes at least one public key based certificate used as part of an electronic transaction wherein the certificate has associated expiry data.

22. The method of claim 20 including the step of determining whether to provide public key based electronic evidence in response to first party trusted evidence archive rule data.

23. The method of claim 20 including the step of determining archive evidence bundle expiry data for at least a portion of data within the electronic transaction evidence and presenting archived electronic transaction evidence for integrity renewal by a trusted party.

24. The method of claim 20 wherein the archive evidence bundle further includes at least:
   certificate policy data associated with the public key certificate data; and
   time stamp data associated with the archive evidence bundle.

25. The method of claim 23 including the step of time stamping, by the trusted party, archived evidence in response to the archive evidence bundle expiry data.

26. The method of claim 20 wherein the reliance entitlement token includes data representing that a recipient of a certificate in an archive evidence bundle is entitled to rely on certificate data in the bundle.

27. The method of claim 20 wherein the step of archiving includes indexing data elements of the electronic transaction evidence and wherein the method includes determining redundant public key based data includes comparing data elements of newly received public key based electronic transaction evidence for archival with the indexed data elements and discarding data elements that already exist as indexed archived data.

28. The method of claim 27 wherein the data elements include at least one data element from the group of: certificate identification data, digital signature identification data, certificate policy data, evidence bundle expiry data, transaction type data, and time stamp data.

29. The method of claim 27 including the step of retrieving archived public key based electronic transaction evidence, in response to a retrieval inquiry, wherein retrieving includes reassembling a predefined bundle of archived public key based transaction evidence data elements using index data that was used to index the indexed data elements.

30. A storage medium comprising memory containing executable instructions that when read by one or more processors causes the one or more processors to:
determine redundant public key based electronic transaction evidence based on a received archive evidence bundle and data from one or more stored archive evidence bundles;
remove the determined redundant public key based electronic transaction evidence prior to archiving public key based electronic transaction evidence on behalf of at least a first party;
archive public key based electronic transaction evidence on behalf of at least a first party; and
determine archive evidence bundle expiry data based on public key expiry data from a plurality of certificates to facilitate integrity renewal of the evidence bundle to provide an updated expiry time for the archive evidence bundle based on determining an earliest expiry time for the archived public key based transaction evidence in response to the public key expiry data for each of all public key certificates of a plurality of public key certificates in the bundle.

31. The storage medium of claim 30 including memory containing instructions that when read by one or more processors, causes the one or more processors to determine whether to provide public key based electronic evidence in response to first party trusted evidence archive rule data.

32. The storage medium of claim 30 including memory containing instructions that when read by one or more processors, causes the one or more processors to determine archive evidence bundle expiry data for at least a portion of data within the electronic transaction evidence and present archived electronic transaction evidence for integrity renewal by a trusted party.

33. The storage medium of claim 30 including memory containing instructions that when read by one or more processors, causes the one or more processors to store archive evidence bundle data including at least:
cryptographic signature data related to an electronic transaction;
public key certificate data related to the cryptographic signature data including public key expiry data: and
at least one reliance entitlement token associated with a recipient of the retrieved archive evidence.

34. The storage medium of claim 33 including memory containing instructions that when read by one or more processors, causes the one or more processors to time stamp, by the trusted party, archived evidence in response to the archive evidence bundle expiry data.

35. The storage medium of claim 30 including memory containing instructions that when read by one or more processors, causes the one or more processors to index data elements of the electronic transaction evidence and compare data elements of newly received public key based electronic transaction evidence for archival with the indexed data elements and discard data elements that already exist as indexed archived data.

36. Electronic transaction evidence archive apparatus comprising:
one or more processors that are operative to execute stored instructions that when executed cause the one or more processors to:
archive an archive evidence bundle comprising public key based electronic transaction evidence on behalf of at least a first party;
determine redundant public key based electronic transaction data based on a received archive evidence bundle and data from the archived evidence bundle;
remove the determined redundant public key based electronic transaction evidence prior to re-archiving non-redundant key based electronic transaction evidence; and
renew the archive evidence bundle comprising the non-redundant public key based electronic transaction evidence based on determining an earliest expiry time for the bundle in response to public key expiry data for all public key certificates of a plurality of public key certificates in the bundle.

37. An electronic transaction evidence archive method performed by one or more machines comprising steps of:
archiving public key based electronic transaction evidence on behalf of at least a first party;
determining redundant public key based electronic transaction data based on a received archive evidence bundle and data from one or more stored archive evidence bundles;
removing the determined redundant public key based electronic archive evidence prior to re-archiving non-redundant key based electronic transaction evidence;
renewing an archive evidence bundle based on determining an earliest expiry time for the bundle in response to public key expiry data for all public key certificates of a plurality of public key certificates in the bundle; and
re-archiving the renewed archive evidence bundle.

38. The system of claim 11 wherein the time stamp station is operative to digitally sign the bundle to renew the integrity of the archive evidence bundle.

39. The electronic transaction evidence archive apparatus of claim 1 comprising memory comprising the stored archive evidence bundles.

* * * * *